(12) United States Patent
Damola

(10) Patent No.: US 8,762,523 B2
(45) Date of Patent: Jun. 24, 2014

(54) MEDIA TRANSFER TO A RENDERER IN A LOCAL NETWORK FROM A SERVER IN A SECOND LOCAL NETWORK

(75) Inventor: Ayodele Damola, Solna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 160 days.

(21) Appl. No.: 13/254,604

(22) PCT Filed: Mar. 1, 2010

(86) PCT No.: PCT/SE2010/050233
§ 371 (c)(1),
(2), (4) Date: Sep. 2, 2011

(87) PCT Pub. No.: WO2010/101515
PCT Pub. Date: Sep. 10, 2010

(65) Prior Publication Data
US 2011/0320572 A1   Dec. 29, 2011

(51) Int. Cl.
*G06F 15/173* (2006.01)

(52) U.S. Cl.
USPC .......... 709/224; 709/220; 709/225; 709/228; 719/328

(58) Field of Classification Search
USPC .......................... 709/220, 228, 224; 719/328
See application file for complete search history.

(56) References Cited

U.S. PATENT DOCUMENTS

| | | | |
|---|---|---|---|
| 8,024,429 B2 * | 9/2011 | Cagenius | 709/219 |
| 8,561,147 B2 * | 10/2013 | Lee et al. | 726/4 |
| 2005/0246726 A1 * | 11/2005 | Labrou et al. | 719/328 |
| 2006/0111880 A1 * | 5/2006 | Brown et al. | 703/1 |
| 2006/0168656 A1 | 7/2006 | Stirbu | |
| 2008/0289009 A1 * | 11/2008 | Lee et al. | 726/4 |
| 2011/0002341 A1 * | 1/2011 | Damola et al. | 370/401 |
| 2011/0320572 A1 * | 12/2011 | Damola | 709/219 |

FOREIGN PATENT DOCUMENTS

| | | |
|---|---|---|
| WO | WO 2007/135499 A2 | 11/2007 |
| WO | WO 2008/054270 A1 | 5/2008 |
| WO | WO 2008/082346 A1 | 7/2008 |
| WO | WO 2008/088259 A1 | 7/2008 |
| WO | WO 2008/108699 A1 | 9/2008 |

* cited by examiner

*Primary Examiner* — Khanh Dinh
(74) *Attorney, Agent, or Firm* — Myers Bigel Sibley & Sajovec, PA

(57) ABSTRACT

A method and arrangement in a first device present in a first local network enables the transfer of media from a media server in a second local network to a media renderer in the first local network. A connection is established between the first device and a gateway in the second local network, and the first device creates a port mapping in the gateway for the media server. The first device creates a URL including the created port mapping and a reference to media content stored in the media server and sends the created URL to the media renderer. The media renderer is able to pull the media content from the media server using that URL.

20 Claims, 4 Drawing Sheets

MEDIA TRANSFER TO A RENDERER IN A LOCAL NETWORK FROM A SERVER IN A SECOND LOCAL NETWORK

CROSS REFERENCE TO RELATED APPLICATIONS

This application is a 35 U.S.C. §371 national stage application of PCT International Application No. PCT/SE2010/050233, filed on 1 Mar. 2010, the disclosure and content of which is incorporated by reference herein in its entirety. The above-referenced PCT International Application was published in the English language as International Publication No. WO 2010/101515 A1 on 10 Sep. 2010.

TECHNICAL FIELD

The invention relates generally to a method and arrangement for enabling transfer of media between devices in opposite local networks, as controlled by a remote control device.

BACKGROUND

Techniques have been developed for multimedia communication involving devices in a limited local network using internal addressing and transport means, also referred to as a private or home network, a LAN (Local Area Network), a residential or office network. In this description, the term "local network" is used to represent any such networks, and the term "device" represents any entity capable of media communication in a local network. The devices in a local network may include any types of entities such as fixed and wireless telephones, computers, media players or "renderers", media servers and television boxes, the latter also called "STB" (Set Top Box).

UPnP (Universal Plug-and-Play) is a technology for establishing standardised device protocols for communication in a local network between different devices that may use different access technologies, operating systems, programming languages, format standards and communication protocols. Further, DLNA (Digital Living Network Alliance) is a technology for acquiring, storing and accessing digital media content in devices of a local network. The UPnP protocol is utilised by DLNA as an underlying protocol for communication between DLNA-enabled devices within local networks. Such DLNA devices are generally capable of using HTTP (Hyper Text Transport Protocol) as a basic transport mechanism for transfer of media in a local network. In addition, RTP (Real Time Protocol) can also be used for media transport in the local network.

UPnP supports a process called "discovery" in which a device can join a local network, obtain a local IP address, announce its name and IP address, and exchange capabilities and services with other devices in the network. In this description, any functions and protocols installed in devices for the transport, communication, encoding/decoding, storing and playout of media will be referred to as "capabilities" for short.

A network architecture called IMS (IP Multimedia Subsystem) has been developed by the 3rd Generation Partnership Project (3GPP) as a platform for handling and controlling multimedia services and sessions. In order to provide IMS-based services for devices in a limited local network and to enable multimedia communication with entities outside the local network, a gateway called "HIGA" (Home IMS Gateway) has been devised as a solution where the IMS network is used for establishing sessions with external entities.

UPnP also defines a Remote Access Architecture RAA, enabling a remote UPnP device located outside the local network to communicate with UPnP devices located within the local network. In particular, the RAA specifies how to provision and configure parameters required for enabling remote access connections between entities having a Remote Access Server RAS and a Remote Access Client RAC, respectively, generally referred to as a UPnP RA procedure.

FIG. 1 illustrates a typical logic structure in a remote device 100 and in a local gateway 102 of a local network, respectively, for enabling remote access to local devices in the network (not shown) according to the UPnP RA procedure. The local gateway 102 may be an RGW (Residential Gateway) and/or a HIGA. A Remote Access Client"RAC" 100a has been configured in the remote device 100 and a corresponding Remote Access Server "RAS" 102a has been configured in the local gateway 102, which can be done when both are present in the local network since RAC 100a and RAS 102a should be configured and synchronized with matching profiles.

The RAC 100a comprises a Remote Access Discovery Agent"RADA" 100b, and the RAS 102a comprises a corresponding Remote Access Discovery Agent "RADA" 102b, both being configured to exchange discovery or "pairing" messages between the two entities 100 and 102. The RAC 100a further comprises a Remote Access Transport Agent "RATA" 100c and the RAS 102a comprises a corresponding Remote Access Transport Agent "RATA" 102c, both being configured to establish a transport channel for media between the two entities 100 and 102. Effectively, the RATAs 100c, 102c will act as opposite end points for signalling and media communication of the remote access.

Solutions have also been developed to enable a first device to control the transfer of media from a second device to a third device within a local network, often referred to as the "3-box scenario". For example, a small handheld wireless phone with limited playout capacity may be used as a control device to direct a laptop computer or a media server to stream video media to a large flat screen TV used as media renderer, in order to view the content on a larger screen and with greater quality as compared to both the wireless phone and the laptop computer.

WO 2008/108699 discloses a solution for media transport across two local networks and according to the 3-box scenario above. In this solution, media can be communicated in a session between a device in a first local network and another device in a second local network by means of gateways in each local network, as initiated by means of control messaging over an IMS network using a remote control device present in the first local network. Although the remote control device is present in one of the two local networks, it does not participate in the media communication itself. This solution requires that the remote control device has an IMS client and a valid IMS subscription and that a HIGA is installed at least in the second local network.

Depicting the basics of this solution, FIG. 2 illustrates first and second local networks 200, 202 and an IMS network 204. Networks 200 and 202 comprise residential gateways RGW 200a and 202a, respectively, and at least the second network 202 further comprises a HIGA 202b for communication with IMS network 204.

A remote control device 200b is visiting the first local network 200 which also includes a TV set 200c, while the second local network 202 includes a media server 202c. The user of device 200b has knowledge of media content being stored in server 202c in network 202 which could be his/her home network. As schematically indicated in the figure, IMS signalling between device 200b and HIGA 202b over IMS network 204 is required for realising and controlling the media transfer from media server 202c to TV set 200c. It is thus required that the device 200b is an IMS client having a valid IMS identity, and that the HIGA 202b is likewise an IMS client installed at least in the second local network. It is thus a limitation that no such media transfer across two local networks according to the 3-box scenario is possible unless the above IMS clients are available.

Another limitation with the prior art is that the current UPnP RA (Remote Access) specification itself does not provide for media transfer across different local networks, e.g. for rendering content from a remote location according to the 3-box scenario, but only for media transfer between a remote device and a local network.

SUMMARY

It is an object of the invention to address at least some of the limitations, problems and issues outlined above. It is also an object to enable media transfer across different local networks according to the 3-box scenario, without requiring the use of IMS clients and an IMS network. It is possible to achieve these objects and others by using a method and an arrangement as defined in the attached independent claims.

According to one aspect, a method is provided in a first device for enabling the transfer of media from a media server in a second local network to a media renderer in the first local network. In this method, a connection is established between the first device and a gateway in the second local network, and a port mapping is created in that gateway for the media server. The first device further creates a URL comprising the created port mapping and a reference to media content stored in the media server, and then sends the created URL to the media renderer. Thereby, the media renderer is able to pull the media content from the media server using that URL.

According to another aspect, an arrangement is provided in a first device present in a first local network, the device being configured to enable the transfer of media from a media server in a second local network to a media renderer in the first local network. According to this arrangement, the first device comprises a connection module adapted to establish a connection between the first device and a gateway in the second local network, and a port mapping module adapted to create a port mapping in the gateway for the media server. The first device further comprises a URL module adapted to create a URL comprising the created port mapping and a reference to media content stored in the media server, and a sending module adapted to send the created URL to the media renderer.

The above method and arrangement may be configured and implemented according to different embodiments. In one embodiment, the port mapping in the URL maps a local IP address and port number of the media server with an external public IP address and port number of the gateway. The media reference may include a file name and path of a media file in the media server. The established connection can be used to browse for content in the media server allowing a user of the first device to select the media content. The established connection may further be a VPN tunnel.

In further possible embodiments, the connection is established between a Remote Access Client RAC in the first device and a Remote Access Server RAS in the gateway, the RAC and RAS having previously been paired in a pairing process. The RAC and RAS may also be compliant to the UPnP RA architecture version 1. The first device may further send the URL to the media renderer based on a UPnP AV procedure. In that case, the first device can send a UPnP AVT Play command to the media renderer which can be translated into a HTTP GET message for fetching the media content from the media server.

If the first device is a mobile phone, it can communicate signalling messages via a VPN tunnel over a cellular network while the actual media can be sent from the media server to the media renderer over a fixed network, e.g. using a streaming technique. In this way, the available communication links and bandwidth can be utilised with great efficiency.

Further possible features and benefits of this solution will become apparent from the detailed description below.

BRIEF DESCRIPTION OF DRAWINGS

The invention will now be described in more detail by means of exemplary embodiments and with reference to the accompanying drawings, in which.

DETAILED DESCRIPTION

Briefly described, a solution is provided to enable a user of a first device, when present in a first local network, to control the transfer of media content from a media server in a second opposite local network for playout on a media renderer in the first local network. The user may thus want to remotely access media content stored in the media server when visiting the first network and play it out on the media renderer, i.e. according to the above 3-box scenario. The invention makes this possible without requiring any IMS subscriptions or IMS messaging, among other things.

Figure 1:
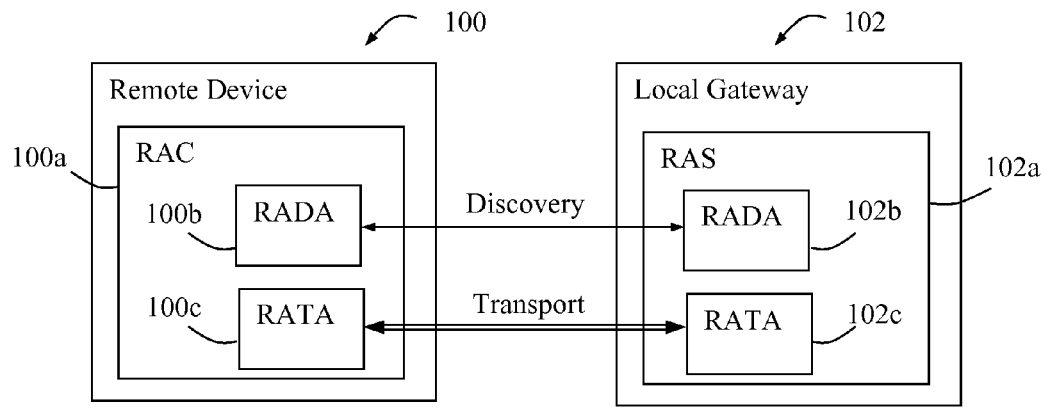
FIG. 1 is a block diagram illustrating a remote device and a local gateway, configured for remote access to devices in a local network, according to the prior art.
Figure 2:
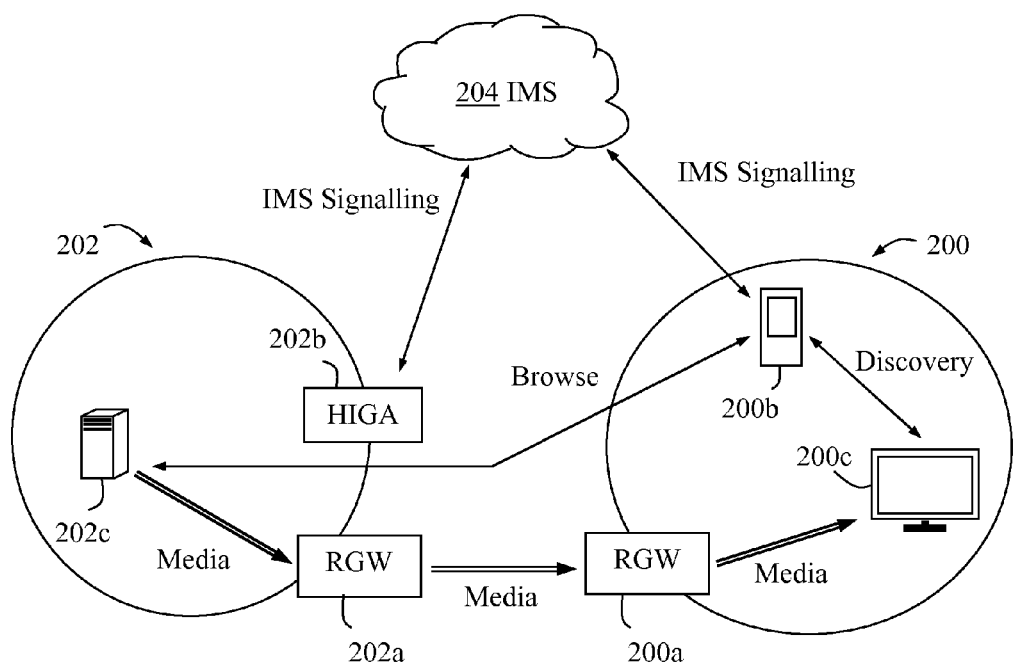
FIG. 2 is a communication overview for a 3-box scheme involving media transfer across two local networks, according to a known solution.

The first device establishes a connection with a gateway in the first local network and thereby becomes virtually a "local" device in the opposite network as well, at least as seen in that network. It is thus possible to obtain such a connection, e.g. a VPN tunnel, between a RAC in the first device and a RAS in the gateway, basically as shown in FIG. 1. This connection enables the user to communicate with local devices in the second network, especially to browse for media in the media server and select any desired media content therefrom.

The first device then creates a port mapping in the gateway for the media server, and further creates a URL (Universal Resource Locator) comprising the port mapping above and a reference to the selected media content stored in the media server. When the first device sends the created URL to the media renderer, the latter is able to pull the corresponding media content from the media server using the received URL, e.g. in a HTTP GET message or similar.

This solution can be employed, e.g. when a user has a media server with media content such as videos in his/her local home network which is connected via a gateway to the Internet. If the user operates a mobile phone and visits another local network that comprises a media renderer useful for playing out such media content, a RAC in the mobile phone can establish a remote access connection for signalling with a RAS in the gateway at home. This is thus done over a wireless or cellular interface and a secure tunnel can be established between the RAC and RAS for UPnP RA signalling.

The use case above allows a gateway device in the visited local network to be a non-remote access device but yet provides a secure way for the user to share media from the home network in the visited network as follows. The user's mobile phone connects to the visited local network over a local interface, e.g. using WiFi. The mobile phone also incorporates a so-called "AV CP" (Audio Video Control Point). Hence, the AV CP in the mobile phone can act as a part of both local networks. The user's mobile phone, the media server at home and the visited media renderer basically form the above 3-box scenario. By connecting the RAC to the home network, the AV CP is able to browse and select content on the media server over that connection.

In the AV setup phase, the AV CP will enable the media stream to be sent from the media server to a public IP address of the visited Internet gateway, using the UPnP RA signalling over the VPN tunnel between the RAC and the RAS. However, the actual media is not streamed through the same tunnel but can be streamed over a fixed connection of the gateway instead of using the usually limited and costly wireless connection of the mobile phone for streaming potentially great amounts of data of the content. Relevant port mappings must be created in the gateway as mentioned above, to enable the stream to reach the media renderer behind the visited gateway, i.e. a NAT (Network Address Translator) therein. Hence, the AV CP in the mobile phone is able to control rendering of the media stream as it is played out on the visited media renderer.

An exemplary scenario for using this solution in a typical 3-box scenario across two local networks, will now be described with reference to FIG. 3. A first local network 300 includes a gateway 300a denoted "RGW" and a media renderer 300b, e.g. a large flat screen TV. A first device 300c, e.g. a mobile phone, is currently present in the network 300, which also comprises a RAC 300d among other things. The user of device 300c is also associated with a local network in his/her home, i.e. the shown second local network 302 which also comprises a gateway 302a likewise denoted "RGW", and a media server 302b.

The gateway 302a further comprises a RAS 302c, and it is assumed that the RAC 300d in device 300c and the RAS 302c in gateway 302a have previously been paired in a regular discovery or pairing process when device 300c was actually present in network 302. Thereby, device 300c is already known and a trusted member of network 302. It is also assumed that device 300c has connected to the visited local network 300, e.g. in a regular discovery or pairing process as described above for FIG. 1 which may be based on the existing protocol called SSDP (Simple Service Discovery Protocol).

In a first illustrated action 3:1, an RA connection is established between the RAC 300d in device 300c and the RAS 302c in gateway 302a, which may preferably be a VPN tunnel or the equivalent. This connection can thus be used for signalling and browsing in order to set forth a media transfer across the two networks 300 and 302 as follows. In a next action 3:2, the user of device 300c is able to browse for media in the server 302b and select media content therefrom for the forthcoming transfer and playout on renderer 300b. Basically, when the user selects a certain media content in the media server, device 300c obtains and saves a suitable reference to that media content which can be used for accessing the actual content from server 302b, which will be done in a later action in this process.

Device 300c then obtains or creates a port mapping in the opposite gateway 302a for the media server 302b, in a further action 3:3, which can also be referred to as "creating a pinhole" in gateway 302a. In a useful example, the port mapping created in this action thus maps a local IP address and port number of the media server 302b with an external public IP address and port number of gateway 302a associated to the media server 302b. By referring to this port mapping, server 302b can be accessed from an entity outside network 302.

In a following action 3:4, device 300c creates a specific URL, in the figure denoted "URL*" comprising the created port mapping and the previously obtained reference to the media content in media server 302b. Device 300c then sends the created URL to the media renderer 300b within the local network 300, in a further action 3:5. For example, the URL may be sent based on a UPnP AV procedure, e.g. in a message "AVT:SetAVTransportURI(URL*)".

In a next action 3:6, media renderer 300b is able to fetch, or "pull", the media content from the media server by means of the received URL, where the URL thus refers to both the port mapping in gateway 302a associated to the media server 302b and to the selected media content therein according to the reference. In another useful example, media renderer 300b may preferably send a HTTP GET message to media server 302b using the URL. The media content will then accordingly be transferred as a content stream from the media server 302b to the media renderer 300b, as shown in a final action 3:7.

Hence, this solution can be used for media transfer according to the 3-box scenario across two local networks without requiring any use of IMS. It should be noted that the signalling activities across the networks 300, 302 made in preparation for the media transfer, is conducted over the connection initially established in action 3:1, while the resulting media transfer according to actions 3:6 and 3:7 is made over another connection by means of external and typically fixed access mechanisms used by the gateways 300a and 302a. Thus, if the first device is a mobile phone, it will communicate signalling messages via the VPN tunnel over a cellular network while the actual media will be sent from the media server to the media renderer over a fixed network.

A procedure, performed by a first device present in a first local network, for enabling the transfer of media from a media server in a second local network to a media renderer in the first local network, will now be described with reference to the flow chart in FIG. 4 comprising steps executed by the first device. In a first step 400, the first device establishes a connection with a gateway in the second local network, which basically corresponds to action 3:1 in FIG. 3. This connection can be used to browse for media in the media server remotely from the first device. In a next step 402, the first device creates a port mapping in the gateway of the second local network for the media server, which basically corresponds to action 3:3 in FIG. 3.

Figure 3:
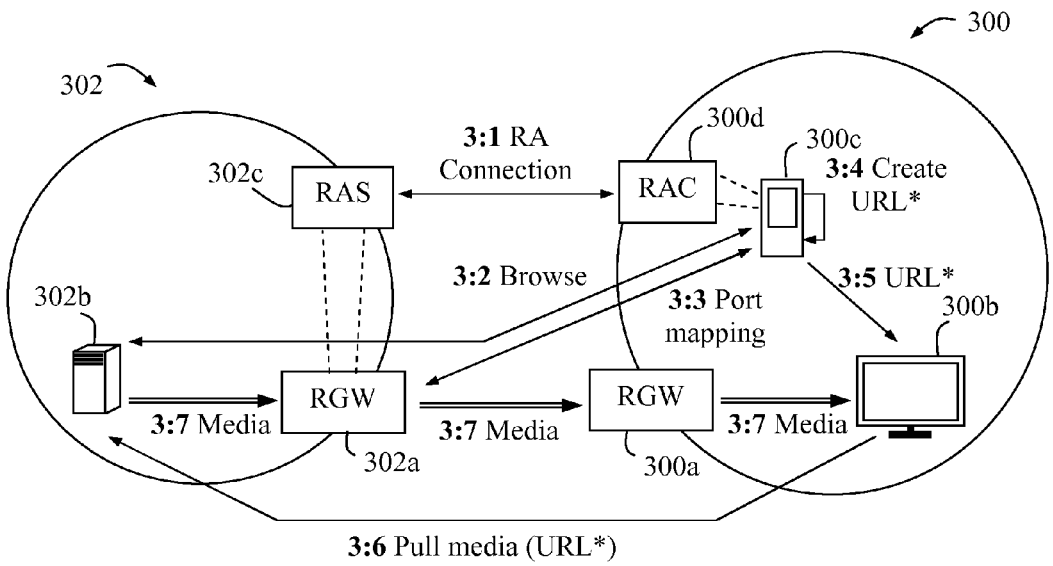
FIG. 3 is a communication overview for a 3-box scheme involving media transfer across two local networks, according to a possible embodiment.
Figure 4:
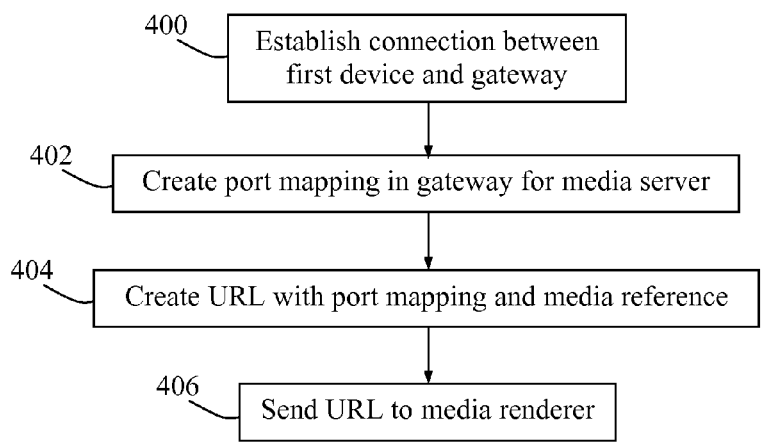
FIG. 4 is a flow chart with steps performed by a first device, according to another possible embodiment.

The first device then creates a URL comprising the created port mapping and a reference to media content stored in the media server, in a step 404 which basically corresponds to action 3:4 in FIG. 3. It is assumed that the media content has been selected by the user of the first device when browsing for media in the media server using the established connection, as described above. In a final step 406, the first device sends the created URL to the media renderer, thereby enabling the media renderer to pull that media content from the media server using the received URL.

Figure 5:
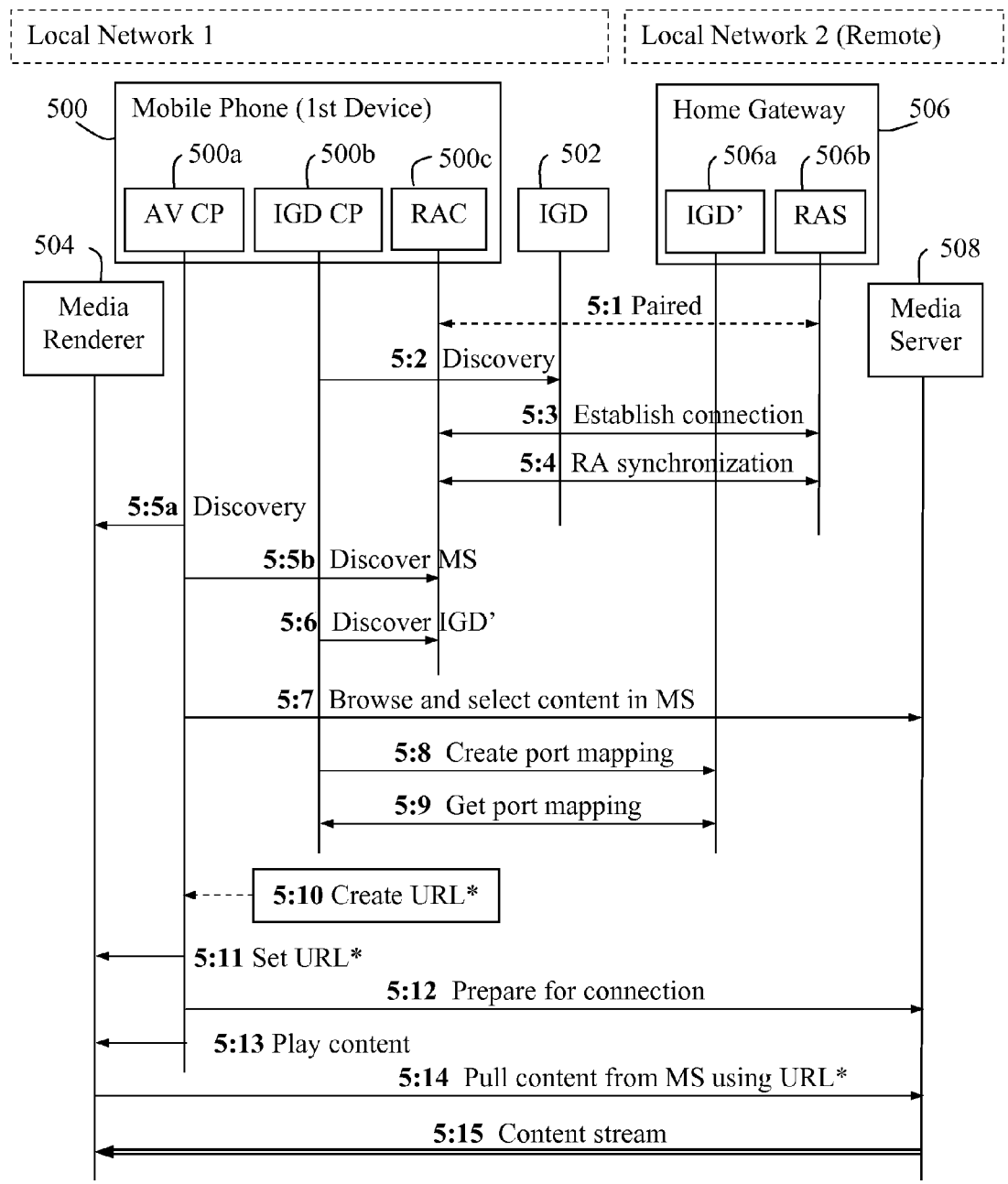
FIG. 5 is a signalling diagram illustrating an example of how the invention can be put into practice, according to further exemplary embodiments.

An example of how the inventive solution can be implemented in practice will now be described with reference to the signalling diagram in FIG. 5. In this example, the following nodes and entities are involved: a first device 500, in this case a mobile phone, which is present in a first local network "1", a gateway function 502 of the first network, in this case denoted "IGD" (Internet Gateway Device) which is a term often used for such local gateway functions, a media renderer 504 also present in the first local network, a home gateway node 506 of a second local network "2", and a media server 508 present in the second local network.

The mobile phone 500 is configured as a possible implementation of the above-described first device, to operate basically as described in the previous examples. In more detail, the mobile phone 500 is configured with an AV CP 500a, an IGD CP 500b and a RAC 500c. Further, the home gateway node 506 is configured with a gateway function IGD' 506a and a RAS 506b. The above functions in the mobile phone 500 and the home gateway 506, respectively, may be configured according to regular UPnP practice or any other equivalent or similar standards and protocols that can be utilised in a novel way for implementing the invention, as described herein.

The procedure in FIG. 5 will now be described in terms of different schematic steps or actions, each of which may represent one or more specific functions and messages transferred back and forth depending on the protocols used. A first action 5:1 illustrates that the RAC 500c and the RAS 506b have been paired at some point in a regular discovery or pairing process, e.g. when the phone 500 was actually present in network 2, which can be seen as a precondition for the following procedure. In a further action 5:2, the IGD CP 500b in mobile phone 500 connects locally to network 1 and performs a discovery or pairing process in which it discovers the local gateway IGD 502, e.g. according to the regular protocol SSDP.

A next action 5:3 illustrates that an RA connection is also established between RAC 500c and RAS 506b in the opposite network 2, e.g. according to the UPnP RA procedure. Further, regular RA synchronization messages are exchanged between RAC 500c and RAS 506b in an action 5:4, effectively providing knowledge to the mobile phone 500 regarding devices in the opposite network 2. The RA synchronization may be made between RADA entities as shown in FIG. 1, which also can be referred to as a "RADA synchronization".

A schematic action 5:5a illustrates that AV CP 500a in mobile phone 500 discovers the media renderer 504 in network 1 and its capabilities for playing out media, e.g. according to the regular protocol SSDP, while another schematic action 5:5b illustrates that AV CP 500a also discovers the media server 504 in network 2. Another schematic action 5:6 further illustrates that IGD CP 500b in mobile phone 500 discovers the gateway IGD' 506a in network 2 from the RAC 500c, by means of the previous RA synchronization made in action 5:4.

Next, the user of mobile phone 500 browses for media in the media server 508 and selects media content therefrom, in a further action 5:7, by means of the connection established in action 5:3. The browsing for media in action 5:7 is executed by the AV CP 500a in the phone 500. A port mapping is then created for the media server 508 in the gateway IGD' 506a, in an action 5:8, which maps a local IP address and port number of server 508 with an external public IP address and port number of IGD' 506a, basically as described for the above examples. A schematic action 5:9 illustrates that IGD CP 500b in mobile phone 500 obtains or gets the port mapping from gateway IGD' 506a.

A next action 5:10 illustrates that a URL is created in the mobile phone 500, which is attained at AV CP 500a, the URL comprising the port mapping above and a reference to the selected media content in server 508. In a further action 5:11, AV CP 500a in mobile phone 500 sends the created URL to media renderer 504, e.g. in a message "AVT:SetAVTransportURI(URL*)", effectively informing the media renderer 504 about the address of the selected media content to be pulled from server 508.

A next schematic action 5:12 illustrates that preparations are made in a communication between AV CP 500a and media server 508 for a connection for the forthcoming media transfer, e.g. using a method called the "AV CM (Audio/Video Connection Management) service". This service allows the media server 508 to prepare itself to connect to the network for the purpose of sending a media stream. In particular, this action allows the media server 508 to indicate whether or not it can establish a connection, e.g. based on the current status of the server and/or current conditions of the network.

In a further action 5:13, AV CP 500a in mobile phone 500 sends a play command to the media renderer 504, effectively triggering renderer 504 to pull the content according to the reference in the URL from the media server 508 in a following action 5:14. Finally, the media content can be transferred in a stream from server 508 to renderer 504, as shown in a last action 5:15.

An arrangement in a first device will now be described in more detail with reference to the block diagram of FIG. 6. When present in a first local network "1", the first device 600 is configured to enable and control the transfer of media from a media server 606 in a second local network "2" to a media renderer 602 in local network 1, i.e. in accordance with the 3-box scenario. Local network 2 also comprises a gateway 604. The device 600 may be used to accomplish any of the above-described procedures and embodiments. The various functions therein are called "modules" in this description, although they could also be seen as unit, blocks, elements or components.

According to this arrangement, the first device 600 comprises a connection module 600a adapted to establish a connection between the first device and a gateway 604 in local network 2, and a port mapping module 600b adapted to create a port mapping in the gateway for the media server. The first device 600 also comprises a URL module 600c adapted to create a URL comprising the created port mapping and a reference to media content stored in the media server, and a sending module 600d adapted to send the created URL to the media renderer 602. Thereby, the media renderer is able to pull the media content from the media server using the received URL.

Figure 6:
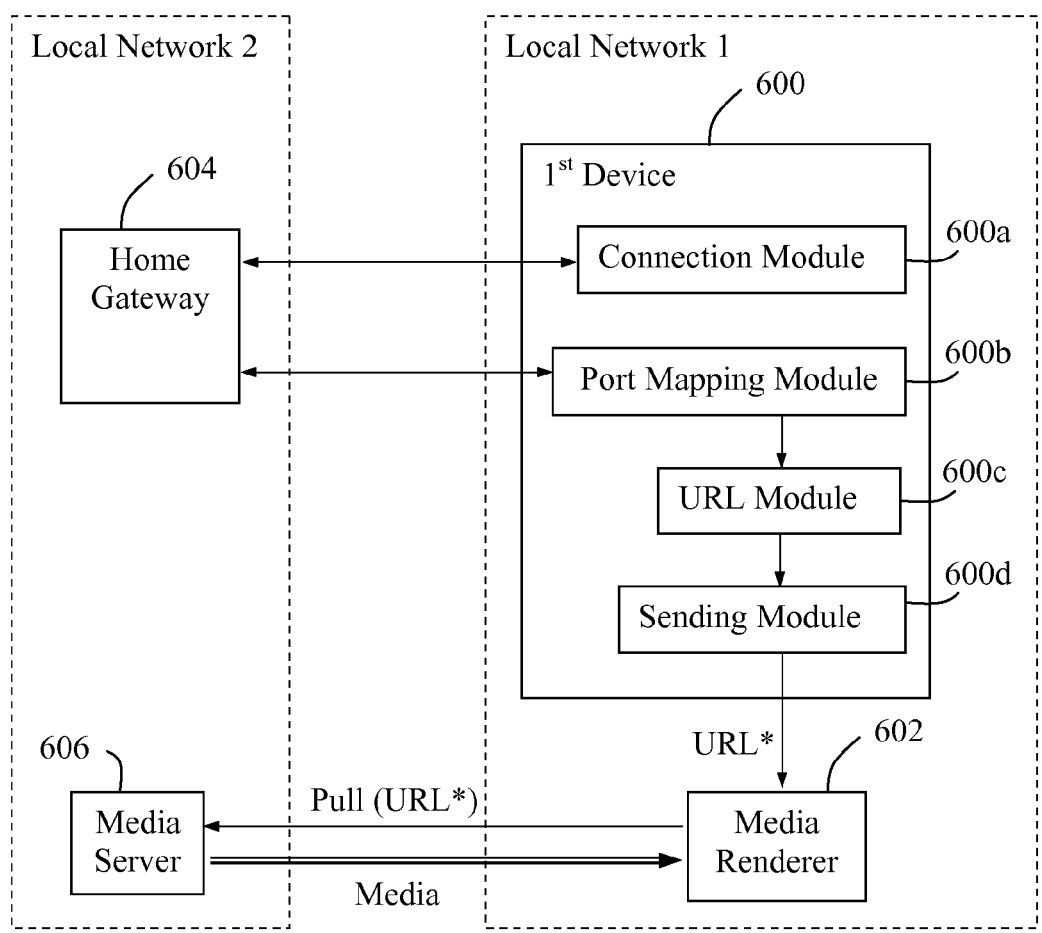
FIG. 6 is a block diagram illustrating in more detail an arrangement in a first device, according to further exemplary embodiments.

It should be noted that FIG. 6 merely illustrates various functional unit or modules in the first device 600 in a logical sense, although the skilled person is free to implement these functions in practice using suitable software and hardware means. Thus, the invention is generally not limited to the shown structures of the device 600, while its functional modules 600a-d may be configured to operate according to the methods and procedures described above for FIGS. 3-5, where appropriate.

The first device 600 may thus be configured or arranged according to various optional embodiments. For example, the connection module 600a may be further adapted to establish the above connection between a Remote Access Client RAC in the first device and a Remote Access Server RAS in the gateway, where the RAC and RAS have previously been paired in a pairing process. In another exemplary embodiment, the sending module 600d is further adapted to send the above URL to the media renderer based on a UPnP AV procedure.

The sending module 600d may also be adapted to send a UPnP AVT Play command to the media renderer which can be translated into a HTTP GET message for fetching the media content from the media server. As mentioned above, the first device may be a mobile phone.

When using the invention, e.g. according to any of the embodiments described above, media transfer across two local networks can be accomplished in a 3-box scenario without requiring any IMS functionality or subscriptions. In this solution, the existing UPnP AV specification can be used in the manner described above with a minimum of impact in the nodes involved. Among other things, the solution can be used when the above-described RAC and RAS applications in the first device and in the gateway of the second local network, respectively, are compliant to the UPnP RA architecture version 1. Further, when a mobile phone is used as the first device, signalling messages for preparing the media transfer are communicated over a cellular network, typically having limited bandwidth, while the actual media can be transferred over a fixed network that is more suitable for the higher data rates typically required for streaming of media.

While the invention has been described with reference to specific exemplary embodiments, the description is generally only intended to illustrate the inventive concept and should not be taken as limiting the scope of the invention. For example, the terms "device", "media server", "media renderer", "gateway", "URL" and "port mapping" have been used throughout this description, although any other corresponding functions, parameters, nodes and/or units may be used having the functionalities and characteristics described here. Although the concepts of UPnP, IGD, RAC and RAS have also been used when describing the above embodiments, any other similar or equivalent standards, protocols and network elements may basically be used as described herein. The invention is defined by the appended claims.

The invention claimed is:

1. A method in a first device present in a first local network of enabling the transfer of media from a media server in a second local network to a media renderer in the first local network, comprising:
    establishing a connection between the first device and a gateway in the second local network;
    creating a port mapping in the gateway for the media server;
    creating a URL comprising the created port mapping and a reference to media content stored in the media server; and
    sending the created URL to the media renderer.

2. A method according to claim 1, wherein the port mapping in the URL maps a local IP address and port number of the media server with an external public IP address and port number of the gateway.

3. A method according to claim 1, wherein the media reference includes a file name and path of a media file in the media server.

4. A method according to claim 1, wherein the established connection is used for browsing for content in the media server allowing a user of the first device to select the media content.

5. A method according to claim 1, wherein the established connection is a VPN tunnel.

6. A method according to claim 1, wherein the connection is established between a Remote Access Client RAC in the first device and a Remote Access Server RAS in the gateway, the RAC and RAS having previously been paired in a pairing process.

7. A method according to claim 6, wherein said RAC and RAS are compliant to the UPnP RA architecture version 1.

8. A method according to claim 1, wherein the first device sends the URL to the media renderer based on a UPnP AV procedure.

9. A method according to claim 8, wherein the first device further sends a UPnP AVT Play command to the media renderer, which can be translated into a HTTP GET message for fetching the media content from the media server.

10. A method according to claim 1, wherein the first device is a mobile phone.

11. A method according to claim 5, wherein the first device communicates signalling messages via the VPN tunnel over a cellular network and the media content is sent from the media server to the media renderer over a fixed network.

12. An arrangement in a first device present in a first local network, the first device being configured to enable the transfer of media from a media server in a second local network to a media renderer in the first local network, wherein the first device comprises:
    a connection module configured to establish a connection between the first device and a gateway in the second local network;
    a port mapping module configured to create a port mapping in the gateway for the media server;
    a URL module configured to create a URL comprising the created port mapping and a reference to media content stored in the media server; and
    a sending module configured to send the created URL to the media renderer.

13. An arrangement according to claim 12, wherein the port mapping in the URL maps a local IP address and port number of the media server with an external public IP address and port number of said gateway.

14. An arrangement according to claim 12, wherein said media reference includes a file name and path of a media file in the media server.

15. An arrangement according to claim 12, wherein the established connection can be used for browsing for the media content in the media server allowing a user of the first device to select the media content.

16. An arrangement according to claim 12, wherein the established connection is a VPN tunnel.

17. An arrangement according to claim 12, wherein the connection module is further configured to establish the connection between a Remote Access Client RAC in the first device and a Remote Access Server RAS in the gateway, the RAC and RAS having previously been paired in a pairing process.

18. An arrangement according to claim 12, wherein the sending module is further configured to send the URL to the media renderer based on a UPnP AV procedure.

19. An arrangement according to claim 18, wherein the sending module is further configured to send a UPnP AVT Play command to the media renderer, which can be translated into a HTTP GET message for fetching the media content from the media server.

20. An arrangement according to claim 12, wherein the first device is a mobile phone.

* * * * *

UNITED STATES PATENT AND TRADEMARK OFFICE
CERTIFICATE OF CORRECTION

PATENT NO. : 8,762,523 B2
APPLICATION NO. : 13/254604
DATED : June 24, 2014
INVENTOR(S) : Damola It is certified that error appears in the above-identified patent and that said Letters Patent is hereby corrected as shown below:

In the Specification

In Column 8, Line 38, delete "unit," and insert -- units, --, therefor.

In Column 8, Line 53, delete "unit" and insert -- units --, therefor.

Signed and Sealed this
Nineteenth Day of May, 2015

Michelle K. Lee
*Director of the United States Patent and Trademark Office*